Nov. 20, 1928.
C. F. WILLIAMS
ENGRAVING MACHINE
Filed May 7, 1924
1,692,103
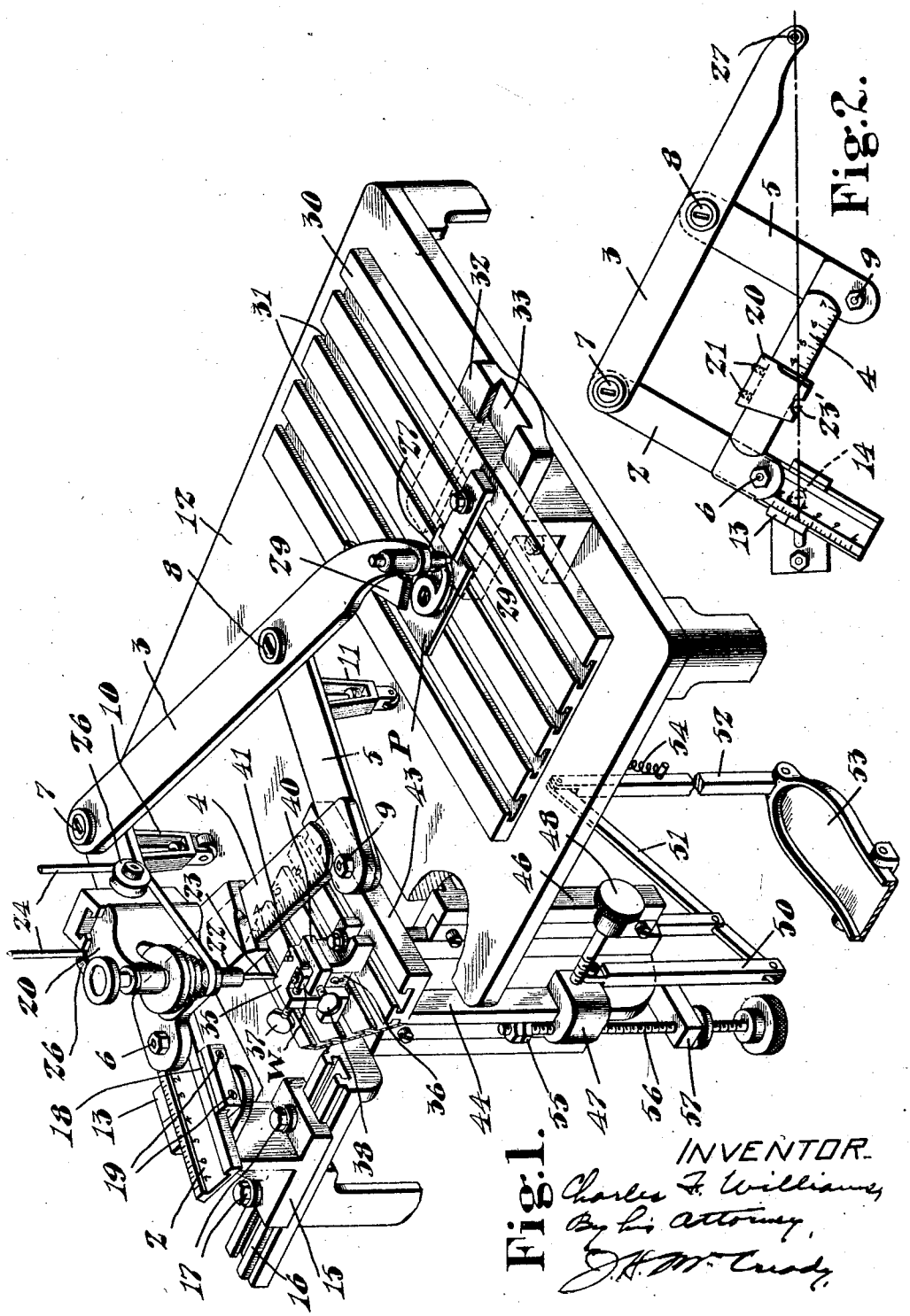

Patented Nov. 20, 1928.

1,692,103

UNITED STATES PATENT OFFICE.

CHARLES F. WILLIAMS, OF STONEHAM, MASSACHUSETTS.

ENGRAVING MACHINE.

Application filed May 7, 1924. Serial No. 711,594.

This invention relates to engraving machines, and it aims to improve machines of this type with a view especially to increasing the range of work which can be handled by a given machine, facilitating the adjustment of the machine for the work to be operated upon, improving the quality of the work produced, and facilitating the introduction and removal of the work from the machine.

The nature of the invention will be readily understood from the following description when read in connection with the accompanying drawings, and the novel features will be particularly pointed out in the appended claims.

Referring now to the drawings,

Figure 1 is a perspective view of an engraving machine embodying this invention in the form at present preferred, certain parts of the machine being shown broken away; and Fig. 2 is a plan view of the pantograph mechanism of the machine.

The machine shown includes a pantograph which comprises an adjustable arm 2, a tracer arm 3, a tool head supporting arm 4, and a link 5 connecting the arms 3 and 4. The arms are connected together by pivots 6, 7, 8 and 9. Castors 10 and 11 are secured to the lower sides of the arms 2 and 5 and run on a table 12 which forms the main support for the machine. The arm 2 is mounted in a holder 13 which is pivotally connected by means of a bolt 14, Fig. 2, to a bracket 15 that is adjustably mounted on a horizontal guideway 16, bolts 17—17 being provided to lock the bracket in its adjusted position. The guide member 16 is secured to, or forms part of, the table 12. A wear piece or gib 18 is located in the holder 13 and may be adjusted by means of screws 19. This arrangement permits the longitudinal adjustment of the arm 2 relatively to the holder 13, and frictionally holds the arm 2 in its adjusted position.

The tool head 20 includes a bracket having a dove-tail slot therein to receive the arm 4, and a wear piece is located in this groove and is backed up by two screws 21, Fig. 2, so that it may be adjusted longitudinally of the arm. This tool head carries a rotary holder 22 for the cutter 23, the holder being arranged to be driven by a round belt 24 which runs over guide pulleys 26—26.

In using this machine it is essential for the production of accurate work that the centers of the fixed pivot 14, the rotary cutter 23, and the tracer or pointer 27 all be in the same line, as will readily be understod by those skilled in this art, and as indicated in Fig. 2. In order to facilitate the adjustment of the machine to vary the ratio of reproduction, while still keeping the points just mentioned in the same line, the adjustable arm 2 and the cutter head arm 4 are correspondingly graduated, as clearly shown in the drawings, so that if the operator adjusts either of these elements, it is merely necessary for him to adjust the other element to the same relative position as indicated by the scale. He then knows that the tracer, cutter, and fixed pivot are all in the same line, and it is not necessary for him to make any trial of his work in order to be sure of this fact.

The pattern P, Fig. 1, is mounted on a pattern table 30, this table having grooves 31 to receive the nuts of the bolts that hold the pattern clamps 29. The pattern table is supported on a bracket 32 which is bolted to the table 12, and this bracket has a dove-tail groove 33 extending at right angles to the groves 31 to receive a dove-tail projection extending downwardly from the lower side of the table 30. A bolt, not shown, is provided to clamp this projection in the groove.

The work support includes a holder 35 having a vertical groove in its front face to receive the work W. This piece of work rests on an adjustable bottom stop or rest 36, and it is clamped against one wall of the groove by means of a thumb screw 37, and is clamped against the back of the groove by another thumb screw 38 which is threaded through the forward end of a U-shaped arm 40 that is pivoted in the back of the holder 35 by means of a pin 41. In order to remove the work, therefore, it is merely necessary to loosen the thumb screw 38 and swing the arm 40 back out of the way, and then to loosen the thumb screw 37. This completely releases the work and it may then be taken out of the work support.

The entire work support is mounted on a work table 43 having grooves to receive the nuts or bolts that clamp the holder to the upper surface of the table. This work table may be moved up and down, and for this purpose it is provided with an integral shank 44 mounted in a dove-tail guideway formed in a vertical bracket 46 that projects downwardly from the lower side of the table 12. A clamp 47 is adjustably secured to the shank 44 by means of a thumb screw 48, and a link 50 is pivoted to the bracket 47 and connects it with one end of a lever 51, the opposite end of which is connected by another link 52 to a treadle 53. The weight of the table, together with the action of the spring 54, normally holds the table in a lowered position, but when the treadle 53 is depressed, the work table is lifted and the extent of this lifting movement is limited by the engagement of the bracket 47 with a nut 55 carried by a screw 56 which is threaded through an arm 57 that projects forward from the bracket 46. The hole in the bracket 47 is large enough to allow it to slide freely on the screw 56 until it strikes the nut 55. The depression of the treadle, therefore, lifts the work to an elevation determined by the adjustment of the screw 56 or the nut 55. This construction and mounting of the work table permits the adjustment of the work in three planes at right angles to each other. An adjustment of the cutter 23 transversely of the grooves in the work table 43 is permitted by the adjustable mounting of the bracket 15, as above described. The work holder 35 may be removed and replaced by any other suitable arrangement for retaining the work in the desired position.

It will now be understood that this invention provides a very simple form of engraving machine, which, due to the adjustments provided, is capable of handling an unusually wide range of work. It should also be observed that the arms of the pantograph all lie in substantially the same horizontal plane, and that the tracer 27 and cutter 23 are located in practically the same plane. This is an important practical advantage since it gives a rigidity to the mechanism which is essential in producing accurate work.

By the location of the tracer 27 and cutter 23 in practically the same plane, I am enabled to locate the work and pattern in a plane substantially parallel thereto. That is to say, the tracer and cutter will be effective on the work and pattern in substantially the same plane with each other and thereby chances of error are minimized.

While I have herein shown and described the best embodiment of my invention that I have so far devised, it will be evident that the invention is not limited to embodiment in the exact form shown.

Having thus described my invention, what I desire to claim as new is:

1. In an engraving machine, the combination of a pantograph mechanism comprising a series of arms pivoted together and all located in substantially the same plane, a holder in which one of said arms is mounted for longitudinal adjustment, means supporting said holder for pivotal movement about a fixed axis, a tool head adjustably mounted on another of said arms, a tracer supported by a third arm of said pantograph, castors carried by certain of said arms, a table on which said castors run, said tool head including means for holding and driving a rotary cutter, and a work support operatively associated with said table, said adjustable arm and said tool head supporting arm being correspondingly graduated.

2. In an engraving machine, the combination of a pantograph mechanism comprising a series of arms pivoted together, all located in substantially the same plane, a table supporting said mechanism, castors carried by certain of said arms and running on said table, a holder in which one of said arms is mounted for longitudinal adjustment, a pivot supporting said holder for movement about a fixed axis, means supporting said pivot for adjustment in a plane parallel to the plane of said table, a tool head adjustably mounted on one of the arms of said pantograph, and a tracer supported by another arm of said pantograph, said tracer and said tool head being effective in a plane substantially parallel to said arms.

3. In an engraving machine, the combination of a pantograph mechanism comprising a series of arms pivoted together, a tool head mounted on one of said arms, a tracer supported on another of said arms, said tool head including means for holding and driving a rotary cutter, a work table, a work support mounted on said table for adjustment in a plane parallel to the work table, a treadle mechanism connected with said table to raise and lower it, and an adjustable stop for limiting the upward movement of the table.

4. In an engraving machine, the combination of a pantograph mechanism comprising a series of arms pivoted together, a tool head mounted on one of said arms, a tracer supported on another of said arms, said tool head including means for holding and driving a rotary cutter, and a work holder for supporting a piece of work for the operation thereon of said cutter, said holder comprising a block having a vertical groove to receive the work, a bottom support for the work, a screw threaded through one side of said block to clamp the work against one side of the groove, and a U-shaped arm pivoted on the back of said block and carrying a screw arranged to clamp the work against the back of the groove.

5. In an engraving machine, the combination of a pantograph mechanism comprising a series of arms pivoted together and all located in substantially the same plane, a support for said mechanism including a table, one of said arms having a castor secured thereto and running on said table, a pivoted holder in which one of said arms is mounted for adjustment longitudinally of itself, a tool head adjustably mounted on another of said arms, and a tracer supported by a third arm, said tool head including means for holding and driving a rotary cutter.

6. In an engraving machine, the combination of a pantograph mechanism comprising a series of arms pivoted together, all located in substantially the same plane, a pivoted holder in which one of said arms is mounted for adjustment longitudinally of itself, a tool head adjustably mounted on another of said arms, said adjustable arm and said cutter head arm being correspondingly graduated, a tracer supported in a third arm of said pantograph, and a support for said mechanism including a table, one of said arms having a castor secured thereto and running on said table.

CHARLES F. WILLIAMS.